United States Patent
Rohatgi et al.

(10) Patent No.: US 12,444,410 B2
(45) Date of Patent: Oct. 14, 2025

(54) GESTURAL PROMPTING BASED ON CONVERSATIONAL ARTIFICIAL INTELLIGENCE

(71) Applicant: NUANCE COMMUNICATIONS, INC., Burlington, MA (US)

(72) Inventors: Abhishek Rohatgi, Roxboro (CA); Eduardo Olvera, Phoenix, AZ (US); Dinesh Samtani, Mississaug (CA); Flaviu Gelu Negrean, Montreal (CA); Manar Alazma, Lexington, MA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 466 days.

(21) Appl. No.: 17/874,146

(22) Filed: Jul. 26, 2022

(65) Prior Publication Data
US 2024/0038225 A1  Feb. 1, 2024

(51) Int. Cl.
*G10L 15/18* (2013.01)
*G06F 3/01* (2006.01)
*G06F 40/30* (2020.01)
*G06F 40/35* (2020.01)
*G06N 3/08* (2023.01)
*G06N 20/00* (2019.01)
*G10L 15/06* (2013.01)
*G10L 15/22* (2006.01)
*G10L 15/24* (2013.01)
*G10L 15/30* (2013.01)

(52) U.S. Cl.
CPC .......... *G10L 15/1815* (2013.01); *G06F 3/017* (2013.01); *G06F 40/30* (2020.01); *G06F 40/35* (2020.01); *G06N 3/08* (2013.01); *G06N 20/00* (2019.01); *G10L 15/063* (2013.01); *G10L 15/22* (2013.01); *G10L 15/24* (2013.01); *G10L 15/30* (2013.01); *G10L 2015/227* (2013.01); *G10L 2015/228* (2013.01)

(58) Field of Classification Search
CPC ... G10L 15/1815; G10L 15/063; G10L 15/22; G10L 15/24; G10L 15/30; G10L 2015/227; G10L 2015/228; G06F 3/017; G06F 40/30; G06F 40/35; B25J 13/003; B25J 11/0005; G06N 3/008; G06N 20/00; G06N 3/08
See application file for complete search history.

(56) References Cited

U.S. PATENT DOCUMENTS

| | | | | |
|---|---|---|---|---|
| 2010/0082345 A1* | 4/2010 | Wang | ...... | G10L 13/00 704/E21.02 |
| 2014/0176436 A1* | 6/2014 | Raffa | ...... | G06F 3/0304 345/158 |
| 2018/0133900 A1* | 5/2018 | Breazeal | ...... | B25J 19/026 |
| 2020/0104037 A1* | 4/2020 | Bar-On | ...... | G06F 3/0416 |
| 2024/0038225 A1* | 2/2024 | Rohatgi | ...... | B25J 13/003 |

* cited by examiner

*Primary Examiner* — Samuel G Neway
(74) *Attorney, Agent, or Firm* — Barta Jones, PLLC (57) ABSTRACT

There is provided a method that includes obtaining data that describes (a) a situation, (b) a gesture for a response to the situation, (c) a prompt to accompany the response, and (d) a gestural annotation for the response, and utilizing a conversational machine learning technique to train a natural language understanding (NLU) model to address the situation, based on the data.

20 Claims, 5 Drawing Sheets

GESTURAL PROMPTING BASED ON CONVERSATIONAL ARTIFICIAL INTELLIGENCE

BACKGROUND OF THE DISCLOSURE

1. Field of the Disclosure

The present disclosure relates to virtual assistants and bots, and more specifically, to a technique that utilizes conversational artificial intelligence for generating gestural prompts.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

A virtual assistant is a computer-implemented application that performs tasks or services for an individual based on commands or questions. A bot is a computer program that operates as an agent for a user or other program or to simulate a human activity.

When humans converse with one another in the real world, they are not only conversing by voice, but also with gestures, e.g., body-language, and movements. Multiple studies suggest that speech perception is inherently multi-modal and integrates visual and auditory speech.

Today, conversational artificial intelligence is limited to virtual assistants and bots that converse via language, but not with gestures. Bots in a virtual world/metaverse will be humanoids and so, there is a need to provide gestural capabilities along with conversational capabilities.

There is a need for a virtual assistant and a bot to better communicate with human peers, by expanding conversational abilities beyond auditory and written speech.

SUMMARY OF THE DISCLOSURE

The present disclosure is directed to a technique that provides gestural responses for expressive bots that have capabilities beyond language-oriented conversation, based on user queries, personalization parameters, and sensory parameters (e.g., location, vision, touch, and tap). The technique creates a gestural model primarily based on natural language understanding (NLU) to come up with the right gesture for a specific context. Sentiment analysis and computer vision could optionally also be utilized as additional inputs to further enhance the gestural outcome.

Conversational artificial intelligence (AI) platforms only address digital channels and apply natural language processing (NLP) and a dialog engine to analyze and provide a verbal response to a user. In the presently disclosed approach, we explore a new humanoid channel that utilizes conversational AI along with other ML models to extract both verbal and gestural prompts.

In the presently disclosed technique, an underlying NLU and dialog engine is responsible for not only providing a verbal intent for a user query, but also mapping the user query to a known gesture category. These categories include (1) deictics, (2) beats, (3) iconics, and (4) metaphorics. Once the gesture category is identified, the gestural parameter also provides a gestural intent for the category. For example, category=deictic, gestural_intent=directional, gestural_entity (product=smart phone). The gestural intent and gestural category can then be mapped with application logic to come with a humanoid gesture. For example, the humanoid points to the smart phone's location in a store by combining the gestural NLU parameters with its application data, which in this case is location awareness.

Thus, there is provided a method that includes obtaining data that describes (a) a situation, (b) a gesture for a response to the situation, (c) a prompt to accompany the response, and (d) a gestural annotation for the response, and utilizing a conversational machine learning technique to train a natural language understanding (NLU) model to address the situation, based on the data.

BRIEF DESCRIPTION OF THE DRAWINGS

A component or a feature that is common to more than one drawing is indicated with the same reference number in each of the drawings.

DESCRIPTION OF THE DISCLOSURE

The present document discloses a method and computer system for utilizing conversational artificial intelligence (AI) for generating gestural prompts and logic for expressive bots that have capabilities beyond language-oriented conversation. The method additionally utilizes a feedback loop, sensory information, and custom logic i.e., logic concerning behavior in a particular situation, society, place, or time, for further gestural refinement.

While people use gestures in a wide range of communicative settings and with different communicative goals, researchers have identified patterns in which people display gestures and have proposed classifications for these patterns. Most of these classifications agree that human gesture is composed of four typical types of movements. These movements include (1) deictic, (2) beat, (3) iconic, and (4) metaphoric. Also referred to as representative gestures, deictic, iconic, and metaphoric gestures are closely related to the semantics of speech.

Beat Gestures

Beat gestures are gestures that do not carry any speech content. They convey non-narrative content and are more in tune with the rhythm of speech. Beat gestures are used regardless of whether the speaker could see the listener or not. Beat gestures accentuate the topic that is being conveyed without directly referring to the topic, emphasizing certain words and phrases during speech as well as the spoken discourse itself and the function of speech. Beats include short, quick, and frequent up-and-down or back-and-forth movements of the hands and the arms that co-occur with and indicate significant points in speech, such as the introduction of a new topic and discontinuous parts in discourse.

Deictic Gestures

Deictic gestures are produced to direct a recipient's attention towards a specific referent in the proximal or distal environment. Deictic gestures include pointing, showing, giving, and reaching, or some combination of these gestures. Deictics point toward concrete objects or abstract space in the environment to call attention to references.

Ionic Gestures

Ionic gestures, also known as a representational or symbolic gestures, are gesture that have some physical resemblance to the meaning or idea for which they stand, such as holding up a hand with a thumb and forefinger very close together to signify that something is very small. Symbolic gestures, such as pantomimes that signify actions, e. g., threading a needle, or emblems that facilitate social transactions, e.g., finger to lips indicating "be quiet", play an important role in human communication. They are autonomous, can fully take the place of words, and function as complete utterances. Iconic gestures depict concrete objects or events in discourse, such as drawing a horizontal circle with the arms while uttering "a big basket."

Metaphoric Gestures

Metaphoric gestures occur when an individual creates a physical representation of an abstract idea or concept, and these gestures provide additional semantic meaning that complements the ongoing speech. Metaphoric gestures visualize abstract concepts or objects through concrete metaphors, such as using one hand to motion forward to indicate future events and motion behind one's self to refer to past events.

Figure 1:
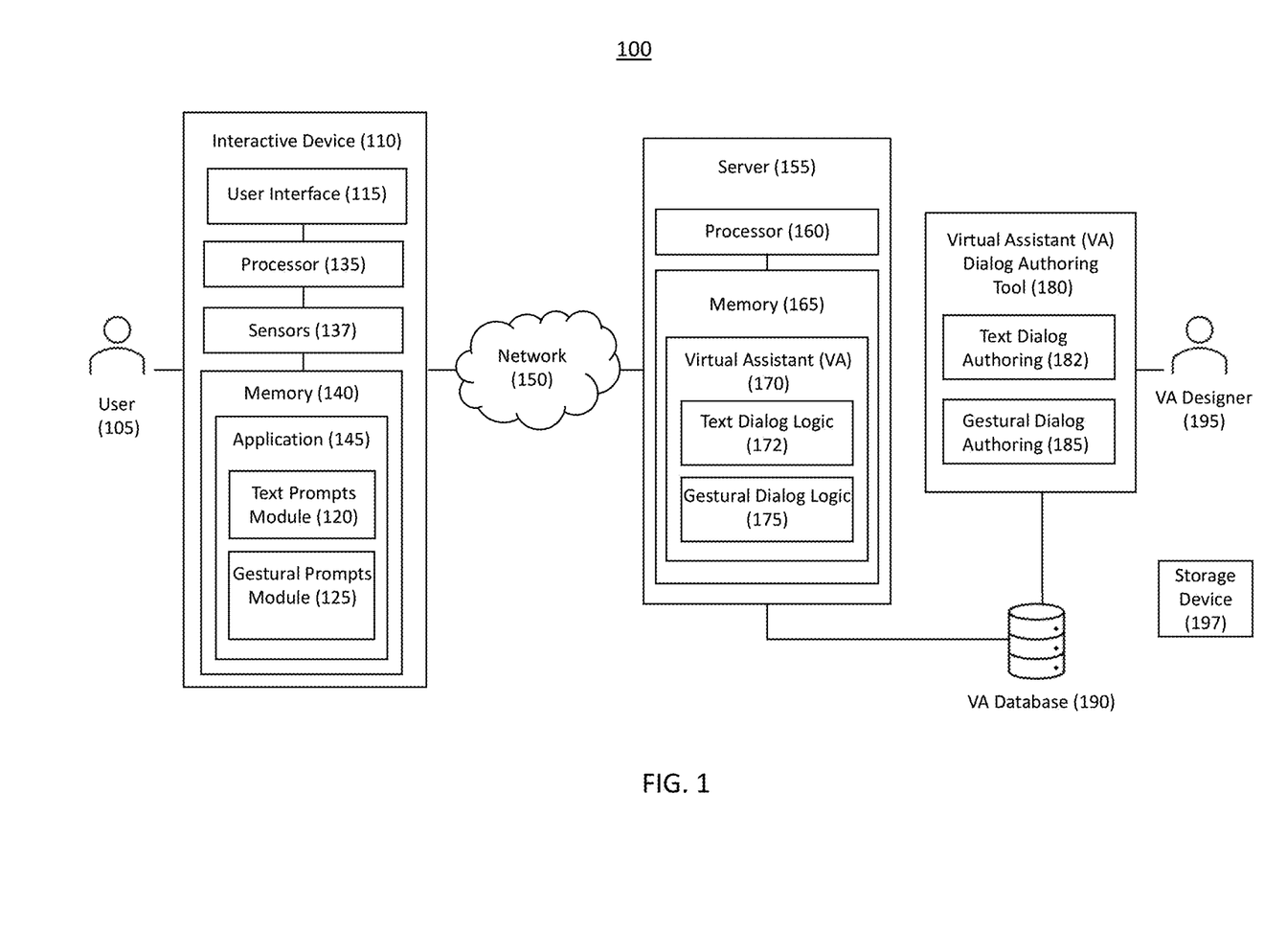
FIG. 1 is a block diagram of a system that utilizes conversational AI for generating gestural prompts and logic for expressive bots.

FIG. 1 is a block diagram of a system 100 that utilizes conversational AI for generating gestural prompts and logic for expressive bots. System 100 includes an interactive device 110, a server 155, a virtual assistant (VA) dialog authoring tool 180, and a VA database 190. Interactive device 110 and server 155 are communicatively coupled to a network 150. Server 155 and VA dialog authoring tool 180 are coupled to VA database 190. Interactive device 110 is utilized by a user 105. VA dialog authoring tool 180 is utilized by a VA designer 195.

Network 150 is a data communications network. Network 150 may be a private network or a public network, and may include any or all of (a) a personal area network, e.g., covering a room, (b) a local area network, e.g., covering a building, (c) a campus area network, e.g., covering a campus, (d) a metropolitan area network, e.g., covering a city, (e) a wide area network, e.g., covering an area that links across metropolitan, regional, or national boundaries, (0 the Internet, or (g) a telephone network. Communications are conducted via network 150 by way of electronic signals and optical signals that propagate through a wire or optical fiber or are transmitted and received wirelessly.

Interactive device 110 includes a user interface 115, a processor 135, sensors 137 and a memory 140.

User interface 115 includes an input device, such as a keyboard, speech recognition subsystem, or gesture recognition subsystem, for enabling user 105 to communicate information to and from interactive device 110, and via network 150, to and from server 155. User interface 115 also includes an output device such as a display or a speech synthesizer and a speaker. A cursor control or a touch-sensitive screen allows user 105 to utilize user interface 115 for communicating additional information and command selections to interactive device 110 and server 155.

Processor 135 is an electronic device configured of logic circuitry that responds to and executes instructions.

Various sensors 137 are utilized for detecting conditions concerning user 105, and sensory parameters (e.g., location, vision, touch, and tap), and may include a microphone, a camera, an accelerometer, a biometric sensor, and detectors of environmental conditions, such as smoke, gas, water and temperature.

Memory 140 is a tangible, non-transitory, computer-readable storage device encoded with a computer program. In this regard, memory 140 stores data and instructions, i.e., program code, that are readable and executable by processor 135 for controlling operations of processor 135. Memory 140 may be implemented in a random-access memory (RAM), a hard drive, a read only memory (ROM), or a combination thereof. One of the components of memory 140 is an application 145.

Application 145 contains instructions for controlling processor 135 to execute operations described herein. In this regard, application 145 includes a text prompts module 120 and a gestural prompts module 125.

In the present document, although we describe operations being performed by application 145 or its subordinate modules, the operations are actually being performed by processor 135.

Server 155 includes a processor 160 and a memory 165.

Processor 160 is an electronic device configured of logic circuitry that responds to and executes instructions.

Memory 165 is a tangible, non-transitory, computer-readable storage device encoded with a computer program. In this regard, memory 165 stores data and instructions, i.e., program code, that are readable and executable by processor 160 for controlling operations of processor 160. Memory 165 may be implemented in a random-access memory (RAM), a hard drive, a read only memory (ROM), or a combination thereof. One of the components of memory 165 is a virtual assistant (VA) 170.

VA 170 contains instructions for controlling processor 160 to execute operations described herein. In this regard, VA 170 includes text dialog logic 172 and gestural dialog logic 175.

In the present document, although we describe operations being performed by VA 170 or its subordinate components, the operations are being performed by processor 160.

VA dialog authoring tool 180 includes components for text dialog authoring 182 and gestural dialog authoring 185.

VA dialog authoring tool 180 may be implemented on a stand-alone device, or on server 155 as a component of memory 165. When implemented as a component of memory 165, operations of VA dialog authoring tool 180 would be performed by processor 160. When implemented on a stand-alone device, the stand-alone device would include a processor and a memory that contains instructions for controlling the processor, and VA dialog authoring tool 180 would be a component of that memory. A desktop computer is an example of such a stand-alone device.

The term "module" is used herein to denote a functional operation that may be embodied either as a stand-alone component or as an integrated configuration of a plurality of subordinate components. Thus, each of application 145, VA 170, and VA authoring tool 180 may be implemented as a single module or as a plurality of modules that operate in cooperation with one another. Moreover, although each of application 145, VA 170, and VA authoring tool 180 is described herein as being installed in a memory, and therefore being implemented in software, they could be implemented in any of hardware (e.g., electronic circuitry), firmware, software, or a combination thereof.

Additionally, the program code for each of each of application 145, VA 170, and VA authoring tool 180 may be configured on a storage device 197 for subsequent loading into their respective memories. Storage device 197 is a tangible, non-transitory, computer-readable storage device, and examples include (a) a compact disk, (b) a magnetic tape, (c) a read only memory, (d) an optical storage medium, (e) a hard drive, (f) a memory unit consisting of multiple parallel hard drives, (g) a universal serial bus (USB) flash drive, (h) a random-access memory, and (i) an electronic storage device coupled the components of system 100 via network 150.

In system 100, VA designer 195 designs a conversation using VA dialog authoring tool 180.

Through text dialog authoring 182, VA designer 195 defines text prompts that will be displayed, or played as audio prompts, via user interface 115, to user 105, for each turn of a conversation.

Through gestural dialog authoring 185, VA designer 195 defines gestures that will be performed via interactive device 110 for each turn of the conversation.

VA dialog authoring tool 180 saves data related to the conversation in VA database 190.

User 105 interacts with interactive device 110, which has VA capabilities. Interactive device 110 can be, for example, a bot, a physical robot or a device with a screen, a projector, an augmented reality headset or a virtual reality headset displaying a virtual avatar.

Interactive device 110 runs application 145 and employs user interface 115 to conduct the conversation with user 105.

Text prompts module 120 presents text prompts to user 105 by displaying them on user interface 115, and/or by transforming them into speech and playing them as audio prompts via user interface 115.

Gestural prompts module 125 presents the gestural prompts to user 105, by performing the gestures using suitable platform functions for gestures. For example, a humanoid bot can execute a "greeting" gestural prompt by waving a hand or lead user 105 to the right direction by performing a "directional" gestural prompt by pointing in the desired direction or changing its own location and leading user 105 to the right path if the humanoid bot is capable of moving.

Interactive device 110 captures user input and environment data using sensors 137 and transmits this information to server 155 over network 150. Server 155 runs virtual assistant 170, which controls and drives the conversation logic.

Server 155 retrieves data related to the conversation logic from VA database 190.

Text dialog logic 172 retrieves the appropriate text prompt or sequence of text prompts for a given conversation turn.

Gestural dialog logic 175 retrieves the appropriate gestural prompt or sequence of prompts for a given conversation turn.

During training, VA designer 195 provides several types of data, via VA dialog authoring tool 180, to server 155. The data describes (a) a situation, (b) a gesture for a response to the situation, (c) a prompt to accompany the response, and (d) a gestural annotation for the response. Processor 160 obtains the data, and utilizes a conversational machine learning technique to train an NLU model to address the situation, based on the data. The NLU model is subsequently utilized in a process that controls a bot.

The situation is a stimulus or event that warrants a response by the bot. Examples include (a) a verbal query, (b) a detection of an entity such as a person, an animal, or an object, or (c) a detection of an environmental condition such as a presence of smoke, gas, or water, or a temperature that exceeds a threshold temperature.

The gesture for a response to the situation is a gesture that VA designer 195 is suggesting that the bot perform in response to the situation. Examples include body motions (e.g., movement of hands, head, fingers, eyes, legs, or torso), facial expressions (e.g., a smile, or a blinking of eyes), and other mechanical actions (e.g., rotation of wheels, or engagement of other mechanical devices). The gestures may include sign language, e.g., American sign language (ASL), for a case where user 105 is hearing-impaired.

The prompt to accompany the response is a phrase or sentence that VA designer 195 is suggesting be spoken or otherwise presented by the bot. In a case where user 105 is hearing-impaired, the prompt would be the substance being presented in the form of sign language.

The gestural annotation for the response is a process of labeling the response to show a gestural outcome that VA designer 195 wishes for the machine learning model to predict.

An NLU model is a machine learning model. A machine learning model is a file that has been trained to recognize certain types of patterns. The model is trained over a set of data from which it can learn. The type of data specific to the NLU model are utterances, intents, entities, vocabulary, gestures, and actions that system 100 uses to respond to situations and natural language inputs from user 105.

Figure 2:
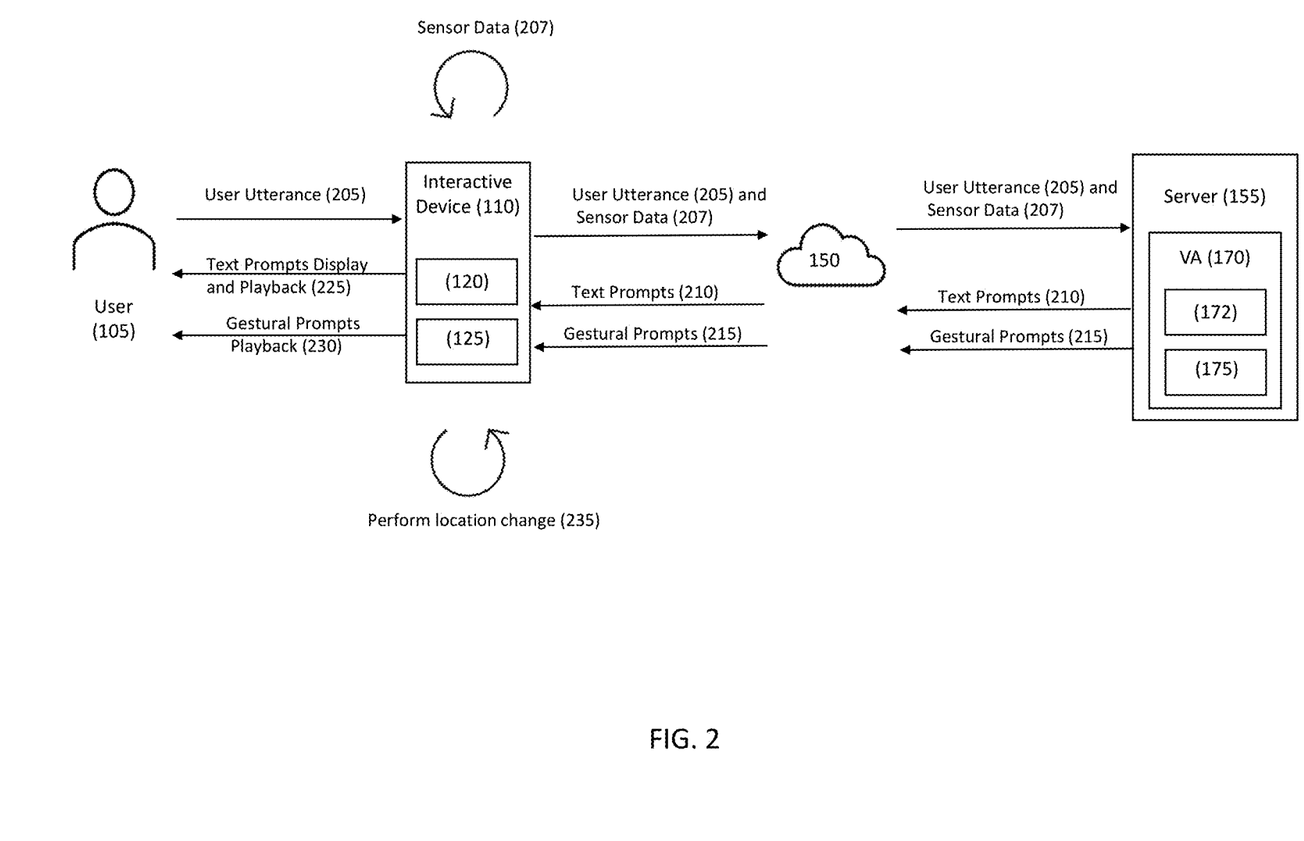
FIG. 2 is a flow diagram of interactions between a user and a virtual assistant in the system of FIG. 1.

FIG. 2 is a flow diagram of interactions between user 105 and VA 170.

User 105 communicates with interactive device 110 and issues a user utterance 205. For example, the user can ask a query "where is the TV section located in this store?"

Interactive device 110 receives user utterance 205 and captures sensor data 207 from sensors 137. The sensor data information 207 could be of various types such as position, proximity to the user, computer vision, audio data, environmental data, etc.

Interactive device 110 transmits user utterance 205 and sensor data 207, via network 150, to server 155.

In server 155, in VA 170, (a) text dialog logic 172 processes user utterance 205, and generates text prompts 210, and (b) gestural dialog logic 175 processes sensor data 207 along with user utterance 205 to generate gestural prompts 215.

Server 155 transmits text prompts 210 and gestural prompts 215, via network 150, to interactive device 110.

Interactive device 110 uses text prompts module 120 for display and playback of text prompts. In this regard, text prompts module 120 processes text prompts 210, produces text prompts display and playback 225, and presents text prompts display and playback 225 to user 105.

Interactive device 110 uses gestural prompts module 125 to perform a gesture. In this regard, gestural prompts module 125 processes gestural prompts 215, produces gestural prompts playback 230, and presents gestural prompts playback 230 to user 105.

Training

Figure 3:
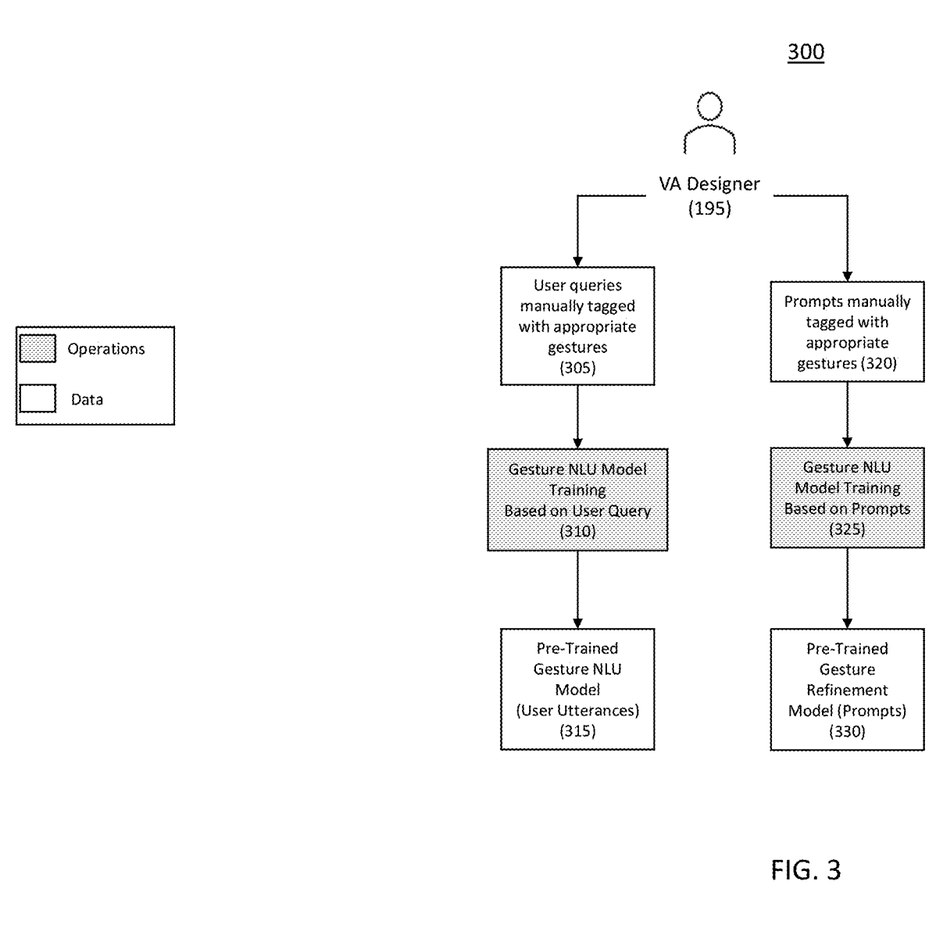
FIG. 3 is a block diagram of a training process performed by the system of FIG. 1.

FIG. 3 is a block diagram of a training process 300 performed by gestural dialog logic 175. For purpose of example, training process 300 is described for a situation that commences with a query. However, in practice, the situation can be any stimulus or event that warrants a response from a bot.

In block 305, VA designer 195 uses VA dialog authoring tool 180 to manually tag hypothetical user queries with appropriate gestural annotations or tags. During the training phase, hypothetical user query data set related to custom domain is utilized and annotated with appropriate gestures. For example, the query "where can I find TVs in this store" can be tagged with the following gestural annotations {"Gestural_Intent": "Directional_Gesture", NLU_Entities: {"Product": "TV"}}.

In operation 310, gestural dialog logic 175 performs gesture NLU model training based on the queries from block 305. Gestural dialog logic 175 uses conversational machine learning techniques on annotated samples from block 305 to create a pre-trained gesture NLU model, i.e., a gesture model 315. Gesture model 315 is type of a machine learning model that has been trained to recognize certain types of gestures. Gesture model 315 can now be used to classify and annotate user queries at runtime into appropriate gestural prompts by outputting appropriate tags for a query.

Similarly, in block 320, VA designer 195 uses gestural dialog authoring tool 185 to manually tag hypothetical prompts, i.e., statements that will be presented by VA 170 to user 105, with appropriate gestures. The textual response prompts can also be tagged with appropriate gestures to further refine the gestural prompt output. These prompts are the responses provided by VA 170 to user 105 via interactive device 110. For example, "Welcome to our store, how can I help you?" the initial greeting prompt played by interactive device 110 when user 105 enters the store can be annotated {"Gestural_Intent": "Welcome_Store_Gesture"}.

In operation 325, gestural dialog logic 175 performs gesture model training based on the tagged prompts from block 320. Gestural dialog logic 175 uses conversational machine learning techniques on the tagged prompts from block 320 to create a pre-trained gesture refinement model 330. Gesture refinement model 330 is a type of a machine learning model that has been trained to recognize certain types of variations tied to a gesture.

The pre-trained gesture refinement model 330, based on annotated prompts, further adds more gestural intents and entities at runtime based on a generated VA prompt 425 (see FIG. 4) in addition to gestures based on user queries alone.

Gestural dialog logic 175 stores gesture models 315 and 330 in VA database 190.

Training is performed on multiple gestures from VA designer 195 so that gesture models 315 and 330 represents multiple gestures. More generally, training is performed on multiple situations from VA designer 195 so that gesture models 315 and 330 can be utilized in a variety of situations.

Runtime

Figure 4:
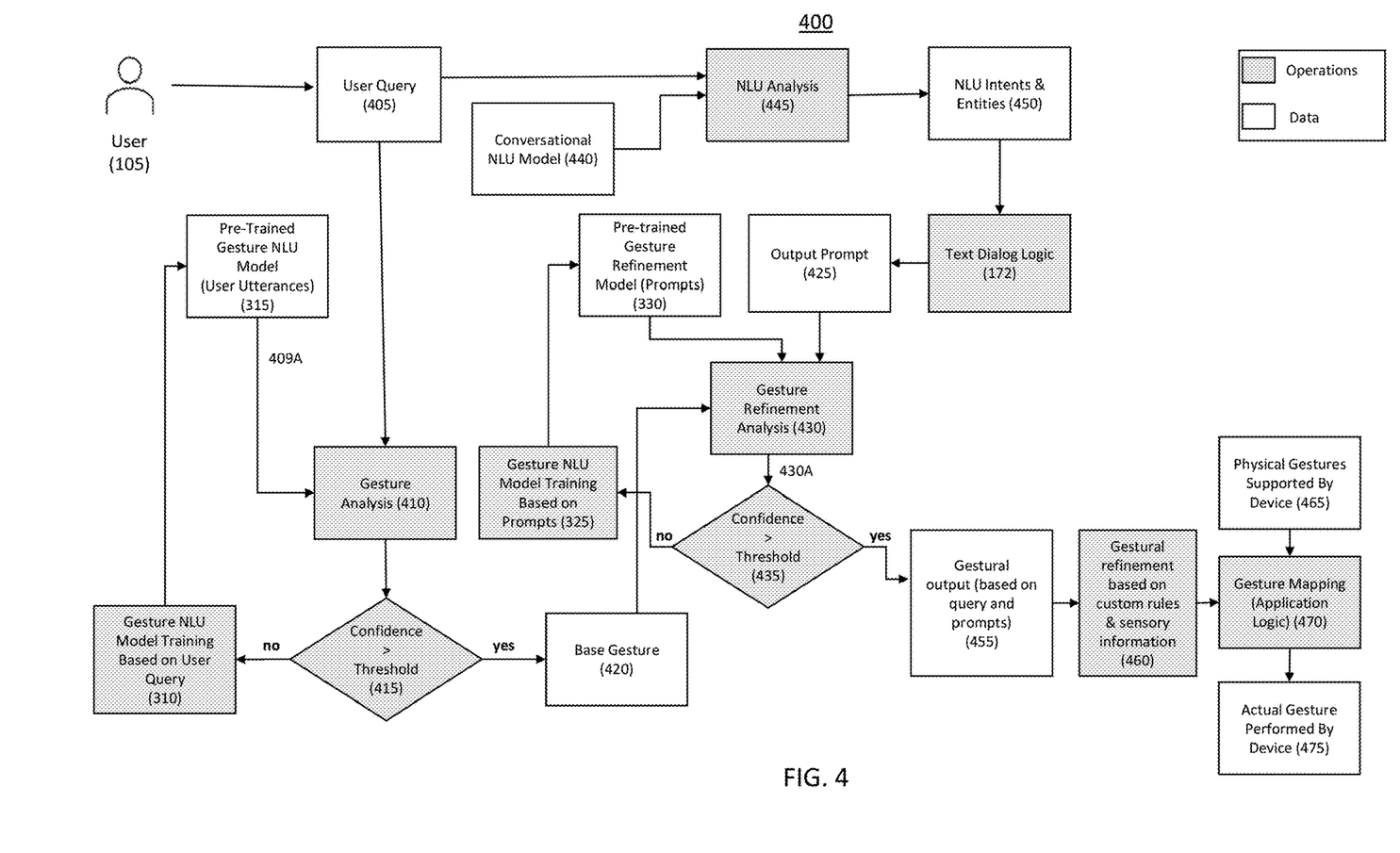
FIG. 4 is a block diagram of a runtime process performed by the system of FIG. 1.

FIG. 4 is a block diagram of a runtime process 400 performed by VA 170. Process 400 utilizes models 315 and 330 to control a bot. For purpose of example, runtime process 400 is described for a situation that commences with a query from user 105. However, in practice, the situation can be any stimulus or event that warrants a response from a bot.

Gesture analysis 410 considers a user query 405 from user 105, and based thereon, extracts a gesture 409A from the generated pre-trained gesture model, i.e., gesture model 315, in VA database 190. For example, when user 105 asks "Where are the TVs located?", gesture model 315 outputs the following tags {"Gestural_Intent": "Directional_Gesture", NLU_Entities: {"Product": "TV"}}.

Gesture analysis 410 performs a gesture analysis on gesture 409A. The gestural analysis predicts the likelihood that user query 405 will fall into a specific gestural intent category. In addition to the extracted gestural category or intent, the analysis also determines the probability or likelihood given using a confidence score value between 0 and 1, where values closer to 1 means "very likely" or "high probability" in classifying under right gestural intent.

In operation 415, gestural dialog logic 175 considers whether confidence in the extracted gesture, i.e., gesture 409A, is greater than a threshold. If the confidence is not greater than the threshold, gestural dialog logic 175 invites VA designer 195 to provide a different gestural annotation or tag (see FIG. 3, block 305). If the confidence is greater than the threshold, gestural dialog authoring tool 185 designates the gesture, i.e., gesture 409A, as a base gesture 420.

Base gesture 420 is based on user query 405 and can be further enriched, as explained below, based on a VA output prompt, i.e., an output prompt 425.

NLU analysis 445 receives user query 405 and applies a conversational NLU model 440 to generate NLU intents and entities 450. The terms "intents and entities" are NLU terminology. An intent captures the general meaning of a sentence. If an intent carries the general meaning of a user utterance, sometimes there is a need for additional information, and this additional information is captured using entities.

Text dialog logic 172 receives NLU intents and entities 450, and extracts output prompt 425. Text dialog logic 172 is a state machine that contains output prompts. The dialog logic state machine transitions to from a first state to a next state using intents and entities as input, and outputs response prompts, i.e., output prompts 425.

For example, for user query 405 "Where can I find the TV?", NLU analysis 445 will generate NLU intents and entities 450 {"NLU_INTENT: PRODUCT_LOCATION_INFORMATION", NLU_ENTITIES {"PRODUCT_CATEGORY": "TV"}}. Now, when text dialog logic 172 operates on NLU intents and entities 450, output prompt 425 is generated as: "You can find TVs on aisle 12."

Gestural refinement analysis 430 extracts a gesture from pre-trained gesture refinement model 330 based on an output prompt 425, by running output prompt 425 against pre-trained gesture refinement model 330. Gestural refinement analysis 430 further refines the extracted gesture by combining it with base gesture 420, thus yielding a refined gesture 430A.

In operation 435, gestural dialog logic 175 considers whether confidence in refined gesture 430A is greater than a threshold. If the confidence is not greater than the threshold, gestural dialog logic 175 invites VA designer 195 to provide a different gesture (see FIG. 3, block 320). If the confidence is greater than the threshold, gestural dialog logic 175 designates refined gesture 430A as a gestural output 455. Taking the previous example "You can find TVs on aisle 12", the gestural prompt now additionally contains the entity or additional information in the utterance and in this case the entity holds the information related to exact location of TV. {"Gestural_Intent": "Directional_Gesture", NLU_Entities: {"Product": "TV", "Location": "Aisle12"}}.

In operation 460, gestural dialog logic 175 processes gestural output 455, which is based on input query 405 and output prompt 425, through another layer of refinement, by applying other sensory information, e.g., sensory data 207 collected by interactive device 110, along with custom logic. Custom logic in this scenario could be based on any additional information extracted from VA database 190. By utilizing operations in 460, a humanoid bot can recognize user 105 using voice biometrics from audio data (sensory information). After user identification, user profile data could be utilized for upsell opportunities and personalization, and additional gestures could be performed accordingly. For example, in a hypothetical situation, if a customer's membership is expiring, a humanoid bot could advise the customer to renew the membership and additionally point the customer to a location in a store where memberships can be renewed. Another type of sensory information that could be utilized is computer vision, which can help provide contextual information in cases when user 105 is pointing to or presenting an object and inquiring about it.

In operation 470, gestural dialog logic 175 produces a final gesture output in textual format (for example JSON, XML, etc.). This gesture output is then utilized by an available and supported physical gestures 465 on interactive device 110 to perform the actual gesture 475. For example, for the gestural output {"Gestural_Intent": "Directional_Gesture", NLU_Entities: {"Product": "TV", "Location": "Aisle12"}}, if interactive device 110 is capable of changing location 235, it will take user 105 to the actual location of Aisle 12, whereas if the humanoid bot is static it will just point user 105 in the direction of Aisle 12.

Figure 5:
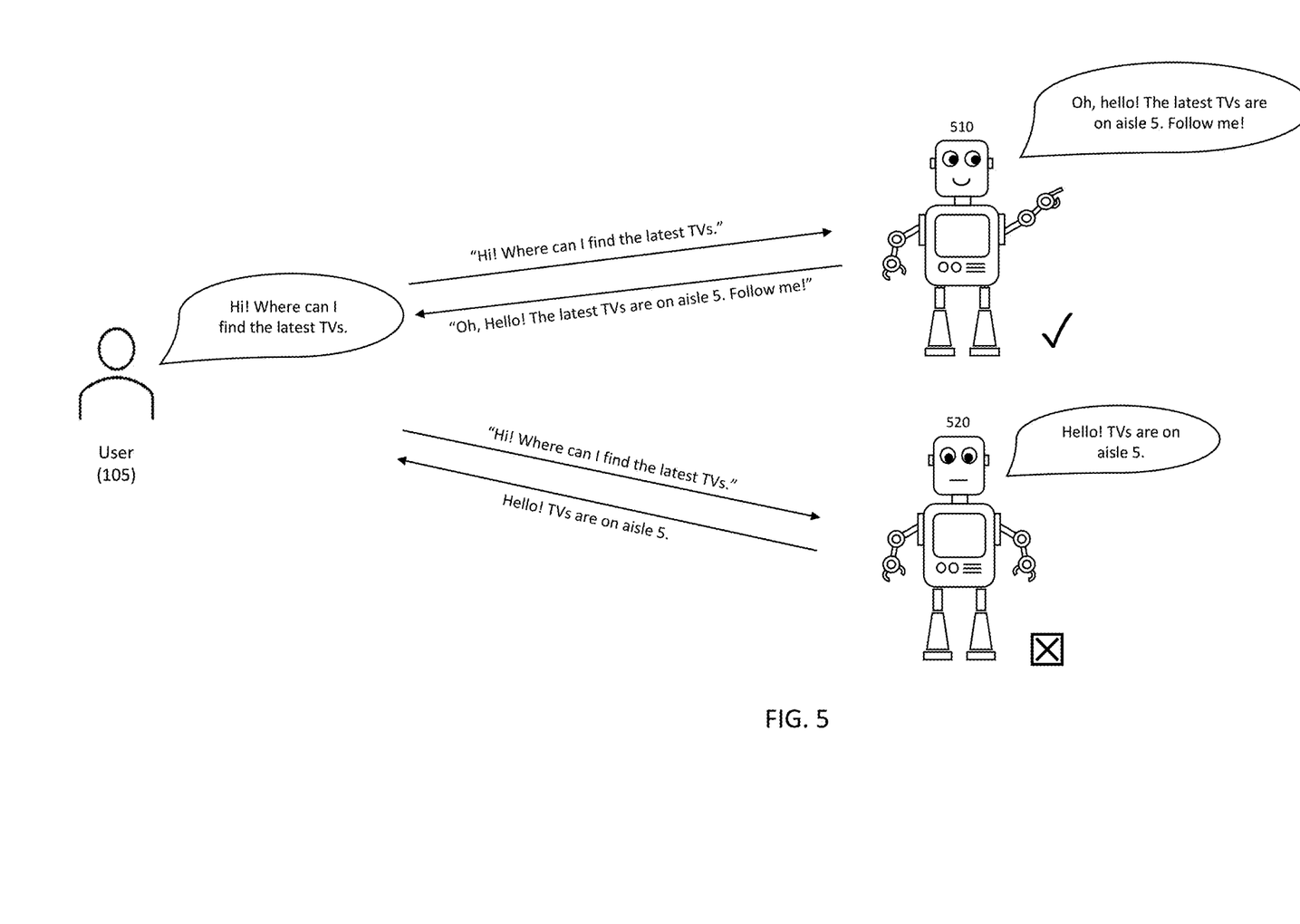
FIG. 5 is an illustration of a user engaged in a conversation with a humanoid bot implemented in the system of FIG. 1.

FIG. 5 is an illustration of user 105 engaged in a conversation with a humanoid bot 510 that is an exemplary embodiment of interactive device 110, implemented in system 100. User 105 says, "Hi! Where can I find the latest TVs?". In response, humanoid bot 510 (a) says, "Oh, hello! The latest TVs are on aisle 5. Follow me!", (b) smiles, and (c) directs its eyes and points in the direction of aisle 5. Thereafter, humanoid bot 510 advances in the direction of aisle 5.

FIG. 5 also shows a hypothetical exchange between user 105 and a bot 520 that is not implemented in system 100. In response to user 105 saying, "Hi! Where can I find the latest TVs?", bot 520 simply states, "Hello! TVs are on aisle 5", with no smile, and no corresponding facial expression or movement.

In FIG. 5, the hypothetical exchange between user 105 and humanoid bot 510 commences with a situation in which user 105 presents a query, i.e., "Hi! Where can I find the latest TVs?". However, humanoid bot 510 can react to other situations such as (a) humanoid bot 510 recognizes an arrival of user 105, without user 105 making any utterance, and humanoid bot 510 responds by initiating a greeting, which could be a type of dietic gesture, (b) an emergency situation where humanoid bot 510 detects smoke, and responds by urging user 105 to vacate a premises, (c) an emergency situation where humanoid bot 510 detects smoke but user 105 is not immediately present, and humanoid bot 510 responds by searching for user 105 in order to assist user 105, or (d) a situation where user 105 is not immediately present, but humanoid bot 510 hears user 105 cry or call for help, and humanoid bot 510 responds by searching for user 105 in order to assist user 105.

The techniques described herein are exemplary and should not be construed as implying any limitation on the present disclosure. Various alternatives, combinations and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof. The terms "a" and "an" are indefinite articles, and as such, do not preclude embodiments having pluralities of articles.

What is claimed is:

1. A method comprising:
    obtaining training data that describes (a) a situation, (b) a gesture for a response to the situation, (c) a prompt to accompany the response, and (d) a gestural annotation for the response, the training data including a hypothetical user query related to a custom domain,
        the situation being a stimulus warranting a response from a natural language understanding (NLU) model,
        the gesture for the response being a suggested gesture in response to the situation from the NLU model,
        the prompt to accompany the response being a suggested phrase in response to the situation from the NLU model, and
        the gestural annotation for the response being a process of labeling the response to show a gestural outcome to be predicted by the NLU model;
    the training data comprising an utterance, an intent, an entity, a vocabulary, a gesture, or an action usable to respond to the situation;
    tagging the hypothetical user query with the gestural annotation for the response; and
    training the NLU model to address the situation, based on the training data, the training comprising:
        based on the tagged hypothetical user query, training the NLU model to recognize a plurality of gesture types, and
        based on recognizing a gesture type of the plurality of gesture types, train the NLU model to classify and annotate a real user query at a runtime based on the recognized gesture type.

2. The method of claim 1, wherein the situation comprises a verbal query.

3. The method of claim 1, wherein the situation comprises a detection of an entity selected from the group consisting of a person, an animal, and an object.

4. The method of claim 1, wherein the situation comprises a detection of an environmental condition.

5. The method of claim 1, wherein the gesture comprises a directional gesture.

6. The method of claim 1, wherein the NLU model is utilized in a process that controls a bot.

7. A system comprising:
    a processor; and
    a memory that contains instructions that are readable by the processor to cause the processor to perform operations of:
        obtaining training data that describes (a) a situation, (b) a gesture for a response to the situation, (c) a prompt to accompany the response, and (d) a gestural annotation for the response, the training data including a hypothetical user query related to a custom domain,
            the situation being a stimulus warranting a response from a natural language understanding (NLU) model,
            the gesture for the response being a suggested gesture in response to the situation from the NLU model,
            the prompt to accompany the response being a suggested phrase in response to the situation from the NLU model, and
            the gestural annotation for the response being a process of labeling the response to show a gestural outcome to be predicted by the NLU model;

the training data comprising an utterance, an intent, an entity, a vocabulary, a gesture, or an action usable to respond to the situation;

tagging the hypothetical user query with the gestural annotation for the response; and training the NLU model to address the situation, based on the training data, the training comprising:

based on the tagged hypothetical user query, training the NLU model to recognize a plurality of gesture types, and based on recognizing a gesture type of the plurality of gesture types, train the NLU model to classify and annotate a real user query at a runtime based on the recognized gesture type.

8. The system of claim 7, wherein the situation comprises a verbal query.

9. The system of claim 7, wherein the situation comprises a detection of an entity selected from the group consisting of a person, an animal, and an object.

10. The system of claim 7, wherein the situation comprises an environmental condition.

11. The system of claim 7, wherein the gesture comprises a directional gesture.

12. The system of claim 7, wherein the NLU model is utilized in a process that controls a bot.

13. A storage device that is non-transitory, comprising instructions that are readable by a processor to cause said processor to perform operations of:

obtaining training data that describes (a) a situation, (b) a gesture for a response to the situation, (c) a prompt to accompany the response, and (d) a gestural annotation for the response, the training data including a hypothetical user query related to a custom domain, the situation being a stimulus warranting a response from a natural language understanding (NLU) model, the gesture for the response being a suggested gesture in response to the situation from the NLU model, the prompt to accompany the response being a suggested phrase in response to the situation from the NLU model, and the gestural annotation for the response being a process of labeling the response to show a gestural outcome to be predicted by the NLU model;

the training data comprising an utterance, an intent, an entity, a vocabulary, a gesture, or an action usable to respond to the situation;

tagging the hypothetical user query with the gestural annotation for the response; and training the NLU model to address the situation, based on the training data, the training comprising:

based on the tagged hypothetical user query, training the NLU model to recognize a plurality of gesture types, and based on recognizing a gesture type of the plurality of gesture types, train the NLU model to classify and annotate a real user query at a runtime based on the recognized gesture type.

14. The storage device of claim 13, wherein the situation comprises a verbal query.

15. The storage device of claim 13, wherein the situation comprises a detection of an entity selected from the group consisting of a person, an animal, and an object.

16. The storage device of claim 13, wherein the situation comprises a detection of an environmental condition.

17. The storage device of claim 13, wherein the gesture comprises a directional gesture.

18. The storage device of claim 13, wherein the NLU model is utilized in a process that controls a bot.

19. The method of claim 1, further comprising:

recognizing a stimulus warranting a response, the stimulus comprising a user query;

based on the stimulus, performing gesture analysis on the stimulus using the trained NLU, the gesture analysis comprising:

classifying the stimulus; and annotating the stimulus into a gestural prompt, the annotating comprising outputting tags based on the stimulus.

20. The method of claim 1, wherein training the NLU further comprises using a conversational machine learning technique.

* * * * *